US011071005B2

(12) United States Patent
Shen et al.

(10) Patent No.: US 11,071,005 B2
(45) Date of Patent: Jul. 20, 2021

(54) CONGESTION AVOIDANCE WITH ADAPTIVE QOS POLICY ENFORCEMENT FROM SD-WAN CONTROLLER IN SD-WAN NETWORKS

(71) Applicant: Cisco Technology, Inc., San Jose, CA (US)

(72) Inventors: Changhong Shen, Shanghai (CN); Yu Zhang, Shanghai (CN); Xiaorong Wang, Shanghai (CN); Pu Duan, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 97 days.

(21) Appl. No.: 16/666,904

(22) Filed: Oct. 29, 2019

(65) Prior Publication Data
US 2020/0413283 A1    Dec. 31, 2020

Related U.S. Application Data

(60) Provisional application No. 62/867,485, filed on Jun. 27, 2019.

(51) Int. Cl.
*H04W 28/02*     (2009.01)
*H04L 12/725*    (2013.01)
(Continued)

(52) U.S. Cl.
CPC ..... *H04W 28/0268* (2013.01); *H04L 41/0896* (2013.01); *H04L 45/302* (2013.01);
(Continued)

(58) Field of Classification Search
None
See application file for complete search history.

(56) References Cited

U.S. PATENT DOCUMENTS 10,542,077 B1 *  1/2020  Balakrishnan .......... H04L 45/16
10,568,112 B1 *  2/2020  Singh ................ H04W 72/1205
(Continued)

FOREIGN PATENT DOCUMENTS

WO    PCT2019096140 A1    5/2019

OTHER PUBLICATIONS

E. Banks; et al., "Software Defined WAN: CloudGenix," Whitepaper; copyright date 2015 by Packet Pushers Interactive, LLC.; dated Oct. 27, 2015; 27 pages.
(Continued)

*Primary Examiner* — Bunjob Jaroenchonwanit
(74) *Attorney, Agent, or Firm* — Baker Botts, LLP

(57) ABSTRACT

According to some embodiments, a method performed by a software defined wide area network (SD-WAN) controller in a SD-WAN network comprising a plurality of aggregation edge routers and a plurality of branch edge routers comprises the following steps. The method comprises: receiving, from each of the plurality of branch edge routers, a transmit location (TLOC) publication comprising a quality of service (QoS) attribute of one or more TLOCs configured on the branch edge router; determining a QoS policy based on the received TLOC publications; transmitting the QoS policy to the plurality of aggregation edge routers; receiving, from a branch edge router of the plurality of branch edge routers, a first congestion indication indicating that bandwidth utilization on a wide area network (WAN) interface of the branch edge router exceeds a first threshold; determining an updated QoS policy based on the received TLOC publications and the first congestion indication to reduce congestion at the branch edge router; and transmitting the updated QoS policy to the plurality of aggregation edge routers.

20 Claims, 7 Drawing Sheets

(51) Int. Cl.
*H04L 12/715* (2013.01)
*H04L 12/851* (2013.01)
*H04W 36/30* (2009.01)
*H04L 12/801* (2013.01)
*H04L 12/24* (2006.01)

(52) U.S. Cl.
CPC .............. *H04L 45/64* (2013.01); *H04L 47/12* (2013.01); *H04L 47/24* (2013.01); *H04W 36/30* (2013.01)

(56) References Cited

U.S. PATENT DOCUMENTS

| | | | |
|---|---|---|---|
| 10,819,630 B1* | 10/2020 | Panchal | H04L 45/64 |
| 10,834,597 B2* | 11/2020 | Kodaypak | H04L 41/12 |
| 2008/0165882 A1* | 7/2008 | Hedayat | H04L 1/0625 |
| | | | 375/267 |
| 2008/0232432 A1* | 9/2008 | Lee | H04L 27/2607 |
| | | | 375/140 |
| 2008/0267122 A1* | 10/2008 | Han | H04L 25/0226 |
| | | | 370/329 |
| 2009/0003274 A1* | 1/2009 | Kwak | H04L 5/0091 |
| | | | 370/329 |
| 2009/0144183 A1* | 6/2009 | Gatchell | G06Q 10/06 |
| | | | 705/34 |
| 2010/0182972 A1* | 7/2010 | Katayama | H04W 72/048 |
| | | | 370/329 |
| 2011/0013585 A1* | 1/2011 | Jitsukawa | H04L 5/0048 |
| | | | 370/330 |
| 2012/0155412 A1* | 6/2012 | Kawamura | H04J 11/003 |
| | | | 370/329 |
| 2013/0016712 A1* | 1/2013 | Tomeba | H04L 25/0204 |
| | | | 370/345 |
| 2013/0017836 A1* | 1/2013 | Chang | H04B 7/086 |
| | | | 455/452.1 |
| 2013/0070703 A1* | 3/2013 | Yasukawa | H04W 72/0406 |
| | | | 370/329 |
| 2014/0226736 A1* | 8/2014 | Niu | H04L 27/2628 |
| | | | 375/260 |
| 2016/0269207 A1* | 9/2016 | Gaal | H04L 27/2613 |
| 2017/0013582 A1* | 1/2017 | Takekawa | H04W 56/0045 |
| 2017/0223732 A1* | 8/2017 | Bertrand | H04W 52/04 |
| 2017/0230138 A1* | 8/2017 | Xiong | H04W 72/0473 |
| 2019/0029026 A1* | 1/2019 | Yun | H04W 72/082 |
| 2019/0036782 A1 | 1/2019 | Smith | |
| 2019/0138008 A1* | 5/2019 | Ross | H04B 17/318 |
| 2019/0166037 A1* | 5/2019 | Shaikh | H03M 13/373 |
| 2019/0222537 A1 | 7/2019 | Kodavanty | |
| 2020/0044930 A1* | 2/2020 | Stafford | H04L 41/0896 |
| 2020/0137150 A1* | 4/2020 | Chatley | H04L 67/1097 |

OTHER PUBLICATIONS

Secure SD-WAN | Barracuda Networks, "Ensure Application Performance and Reduce Costs," What is SD-WAN and Why Do I Need It?; Barracuda Cloudgen Firewall, Boost Application performance and reduce costs; https://www.barracuda.com/products/cloudgenfirewall/use_cases/sd-wan; 4 pages, printed Jul. 26, 2019.

Press Release, "SD-WAN Market Leader Aryaka Unveils Application-Driven Adaptive QoS for the WAN at ONUG Spring 2018"—Aryaka; https://www.aryaka.com/press/sd-wan-market-leader-aryaka-unveilis-application-driven-adaptive-qos-wan-onog-spring-2018/; Dated May 6, 2018, printed Oct. 21, 2019; 3 pages.

Citrix® Product Documentation, "Adaptive Bandwidth Detection," white paper; https://docs.citrix.com/en-us/citrix-sd-wan/10-1/adaptive-bandwidth-detection-sd-wan.html; Dated Jan. 11, 2019; 2 pages.

\* cited by examiner

CONGESTION AVOIDANCE WITH ADAPTIVE QOS POLICY ENFORCEMENT FROM SD-WAN CONTROLLER IN SD-WAN NETWORKS

RELATED APPLICATIONS

This application claims priority to U.S. Provisional Application Ser. No. 62/867,485 entitled "Congestion Avoidance with Adaptive QoS policy enforcement from SD-WAN Controller in SD-WAN Networks," filed Jun. 27, 2019, the entire content of which is incorporated herein by reference.

TECHNICAL FIELD

This disclosure generally relates to software defined networking in a wide area network (SD-WAN), and more specifically to congestion avoidance with adaptive quality of service (QoS) policy enforcement from a SD-WAN controller.

BACKGROUND

Traditional wide area network (WAN) architectures connect users at branch or campus locations to applications hosted on servers in a data center. Typically, dedicated Multiprotocol Label Switching (MPLS) circuits are used for security protection and reliable connectivity. However, businesses are becoming increasingly mobile, and business-critical applications are operating over the Internet across multiple clouds. Traditional WAN architectures may be limited in available bandwidth, security, and complexity management, which may hinder a business's productivity.

Software defined networking in a WAN (SD-WAN) simplifies the management and operation of a WAN by decoupling the networking hardware from its control mechanism. Advantages include reducing costs with transport independence across multiple technologies, improving business application performance and increasing agility, optimizing the user experience and efficiency for SaaS and public cloud applications, and simplifying operations with automation and cloud-based management.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

Figure 1:
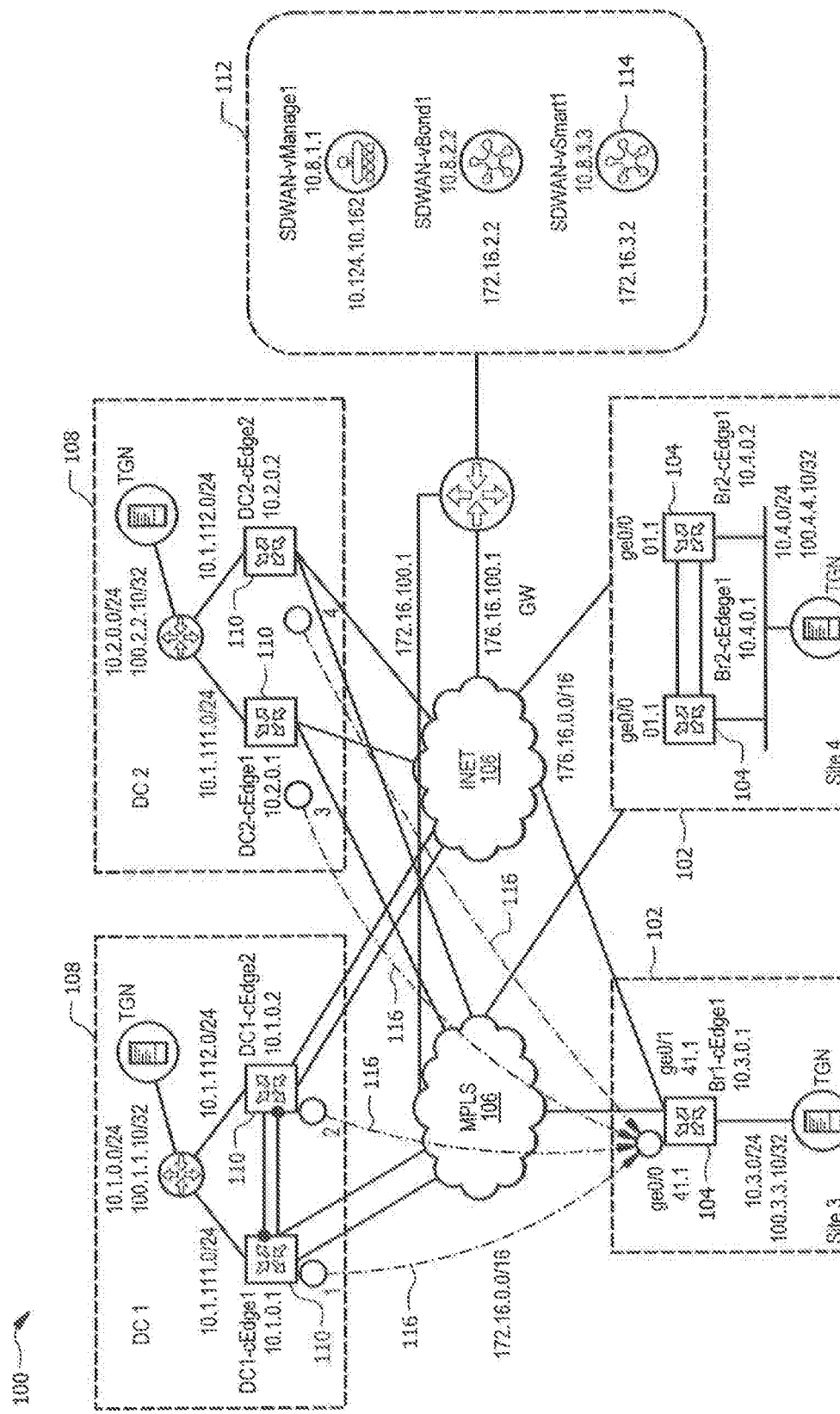
FIG. 1 is network diagram illustrating a typical SD-WAN topology.

According to some embodiments, a method performed by a software defined wide area network (SD-WAN) controller in a SD-WAN network that comprises a plurality of aggregation edge routers and a plurality of branch edge routers comprises the following steps. The method comprises: receiving, from each of the plurality of branch edge routers, a transmit location (TLOC) publication comprising a QoS attribute of one or more TLOCs configured on the branch edge router; determining a QoS policy based on the received TLOC publications; transmitting the QoS policy to the plurality of aggregation edge routers; receiving, from a branch edge router of the plurality of branch edge routers, a first congestion indication indicating that bandwidth utilization on a wide area network (WAN) interface of the branch edge router exceeds a first threshold; determining an updated QoS policy based on the received TLOC publications and the first congestion indication to reduce congestion at the branch edge router; and transmitting the updated QoS policy to the plurality of aggregation edge routers.

In particular embodiments, the method further comprises: receiving, from the branch edge router of the plurality of branch edge routers, a second congestion indication indicating that bandwidth utilization on the branch edge router WAN interface is below a second threshold; determining an updated QoS policy based on the received TLOC publications and the second congestion indication; and transmitting the updated QoS policy to the plurality of aggregation edge routers.

In particular embodiments, the QoS attribute comprises a downstream bandwidth and/or a bandwidth shaper ratio. The bandwidth shaper ratio may be based on a number of aggregation edge routers in communication with the branch edge router.

In particular embodiments, the TLOC publications are published using overlay management protocol (OMP).

In particular embodiments, the bandwidth utilization includes current and historical bandwidth utilization.

According to some embodiments, a SD-WAN controller in a SD-WAN network that comprises a plurality of aggregation edge routers and a plurality of branch edge routers comprises processing circuitry operable to perform any of the SD-WAN controller methods described above.

According to some embodiments, a method performed by an aggregation edge router in a SD-WAN comprising a SD-WAN controller and a plurality of branch edge routers comprises the following steps. The method comprises: receiving a QoS policy from the SD-WAN controller. The QoS policy is based on TLOC publications from the plurality of branch edge routers, and the QoS policy comprises a QoS attribute for each TLOC published by the plurality of branch edge routers. The method further comprises determining, based on the received QoS policy, a parent shape rate for each of the TLOCs, and communicating with a branch edge router according to the QoS policy and determined parent shape rate.

In particular embodiments, the method further comprises receiving, from the SD-WAN controller, an updated QoS policy. The updated QoS policy is based on the TLOC publications from the plurality of branch edge routers and a congestion indication from a branch edge router of the plurality of branch edge routers. The method further comprises determining, based on the updated QoS policy, an updated parent shape rate for each of the TLOCs, and communicating with a branch edge router according to the updated QoS policy and updated parent shape rate.

In particular embodiments, the QoS attribute comprises a downstream bandwidth and/or a bandwidth shaper ratio. The bandwidth shaper ratio may be based on a number of aggregation edge routers in communication with the branch edge router.

In particular embodiments, the QoS policy is received using OMP.

According to some embodiments, an aggregation edge router in a SD-WAN comprising a SD-WAN controller and a plurality of branch edge routers comprises processing circuitry operable to perform any of the aggregation edge router methods described above.

According to some embodiments, a method performed by a branch edge router in a SD-WAN comprising a SD-WAN controller and a plurality of aggregation edge routers comprises the following steps. The method comprises: transmitting, to the SD-WAN controller, a TLOC publication comprising a QoS attribute of one or more TLOCs configured on the branch edge router; receiving communications from one or more of the plurality of aggregation edge routers according to a first QoS policy implemented at the plurality of aggregation edge routers; determining that bandwidth utilization on a WAN interface of the branch edge router exceeds a first threshold; transmitting a first congestion indication to the SD-WAN controller; and receiving communications from one or more of the plurality of aggregation edge routers according to a second QoS policy implemented at the plurality of aggregation edge routers. The second QoS policy is based at least in part on the first congestion indication.

In particular embodiments, the method further comprises: determining that bandwidth utilization on the WAN interface of the branch edge router is below a second threshold; transmitting a second congestion indication to the SD-WAN controller; and receiving communications from one or more of the plurality of aggregation edge routers according to a third QoS policy implemented at the plurality of aggregation edge routers. The third QoS policy is based at least in part on the second congestion indication.

In particular embodiments, the QoS attribute comprises a downstream bandwidth and/or a bandwidth shaper ratio. The bandwidth shaper ratio may be based on a number of aggregation edge routers in communication with the branch edge router.

In particular embodiments, the TLOC publications are transmitted to the SD-WAN controller using OMP.

In particular embodiments, the bandwidth utilization includes current and historical bandwidth utilization.

According to some embodiments, a branch edge router in a SD-WAN comprising a SD-WAN controller and a plurality of aggregation edge routers comprises processing circuitry operable to perform any of the branch edge router methods described above.

For a typical enterprise wide area network (WAN) deployment, bandwidth availability at each site may differ. In many deployments, branches have much less bandwidth compared to the head-end, and large branches generally have more bandwidth capacity than small branches. A typical retailer deployment may have a 1.5 Mbps Ti line available at a branch for multi-protocol label switched (MPLS) path, and 10M digital subscriber line (DSL) or 50 Mbps private virtual local area network (PVLAN) interfaces for load-balancing and/or backup.

In such mixed capacity scenarios, the high bandwidth sites can overwhelm the lower bandwidth sites. The problem is exacerbated when a software defined WAN (SD-WAN) shifts from a hub-spoke topology to a meshed topology.

In particular SD-WAN scenarios, such as a Viptela SD-WAN scenario, one branch site router may communicate with many senders because each hub border router establishes full SDWAN session and connectivity via all transports, either via direct connect or transport location (TLOC) extension. An example is illustrated in FIG. 1.

FIG. 1 is network diagram illustrating a typical SD-WAN topology. SD-WAN 100 includes one or more branch sites 102 (e.g., satellite offices, retail locations, storage facilities, etc.), one or more aggregation sites 108 (e.g., datacenter, etc.), and SD-WAN management network 112.

Each branch site 102 includes one or more branch edge routers 104. Branch site 102 may include a single branch edge router 104 (such as illustrated Site 3) or may include more than one branch edge router 104 (such as illustrated Site 4) for redundancy. Branch edge router 104 may comprise hardware and software components described in more detail with respect to FIG. 7.

Each aggregation site 108 includes one or more aggregation edge routers 110. The aggregation edge routers connect with one or more branch edge routers 104 to provide network services to branch sites 102. Aggregation edge routers 110 connect to one or more branch edge routers 104 via one or more networks 106. Aggregation edge router 110 may comprise hardware and software components described in more detail with respect to FIG. 7.

SD-WAN management network 112 creates and manages software defined network connections 116 over networks 106 to connect aggregation edge routers 110 and branch edge routers 104. SD-WAN management network 112 includes SD-WAN controller 114. SD-WAN controller 114 may comprise hardware and software components described in more detail with respect to FIG. 7.

Network 106 comprises any type of network that facilitates communication between components of SD-WAN 100. Network 106 may connect one or more components of SD-WAN 100. One or more portions of network 106 may include an ad-hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a combination of two or more of these, or other suitable types of networks. Network 106 may include one or more networks. One or more components of SD-WAN 100 may communicate over network 106. Network 106 may include a core network (e.g., the Internet), an access network of a service provider, an Internet service provider (ISP) network, and the like. One or more portions of network 106 may use SD-WAN technology.

During operation of SD-WAN 100, ingress congestion and overrun on a branch site, such as branch sites 102 illustrated in FIG. 1, can cause churn and random packet drops without quality of service (QoS) assurance. Even worse, the congestion and overrun can lead to the branch edge router losing reliable connectivity to the SD-WAN controller, such as a vManage and/or vSmart controller, resulting in the branch edge router operating in head-less mode.

Single per-spoke QoS control on the head-end egress direction based on remote WAN bandwidth does not provide much benefit for ingress bandwidth projection from the branch site perspective because of the dynamic nature of the multipoint-to-point (MP-2-P) traffic model, such as multiple hub border routers, multiple data-centers and even partial and full meshed SD-WAN topologies.

Existing congestion avoidance is based on traditional QoS approach like traffic policing or shaping on ingress and egress direction per tunnel or router behavior, which is a static and fixed configuration, and cannot resolve most challenging QoS issues with MP-2-P dynamic SD-WAN topologies.

Adaptive QoS on a dynamic multipoint VPN (DMVPN), which measures the loss between sender (hub) and receiver (spoke) with an in-band control-plane measuring the varied capability of the P2P link with an adaptive shaper, is not well proven for an effective solution, especially for multi-hub or multi-datacenter topologies.

Example Embodiments

Particular embodiments obviate one or more of the problems described above and include centralized QoS policy control from an SD-WAN controller to provide remote site ingress WAN congestion avoidance with adaptive QoS policy enforcement based on SDWAN session real-time bandwidth utilization in SD-WAN networks. Particular embodiments provide additional bandwidth protection with ingress QoS and service assurance for diverse network topologies and traffic models in SD-WAN networks.

Particular embodiments may include one or more of the following advantages. For example, QoS is traditionally a local data policy for routers. Particular embodiments described herein include an innovative idea of a centralized QoS policy control model and QoS policy enforcement per SDWAN session level to achieve network level QoS control and bandwidth protection with QoS and bandwidth monitoring together with SD-WAN traffic engineering and control, which provides significant business value for SD-WAN solutions and also considerable differentiation from conventional SDWAN solutions from a QoS perspective.

Particular embodiments also improve the operation of SD-WAN network components, such as edge routers, by improving congestion control which reduces lost packets and increases bandwidth efficiency.

Particular SD-WAN embodiments, such as the Cisco Viptela SD-WAN solution, include a SD-WAN controller, such as a vSmart controller, which is the core software defined controller that provides the network-level centralized policy abstraction and configuration, and also publishes network topology and route information via the overlay management protocol (OMP). Currently, SDWAN QoS is a device level local data policy from an SD-WAN network manager, such as vManage, that is applied on a physical transport interface level. The QoS policy may include, for example, 8-class and queue policy.

Using SD-WAN per-tunnel QoS feature, each datacenter hub router (also referred to generally as an aggregation edge router) may enforce a QoS policy instance based on a group policy template with the parent shape rate based on remote WAN bandwidth offered during SD-WAN session bring up. Similar to traditional DMVPN per-spoke QoS, particular embodiments may use SD-WAN OMP publishing of TLOC group/color and bandwidth capability information. Each datacenter hub router enforces the specific QoS policy template based on TLOC and bandwidth information independently.

Particular embodiments further extend SDWAN per-session QoS feature to support dynamic shaper bandwidth based on the customized diverse network topology and branch site current bandwidth utilization and congestion state of remote WAN interfaces. Given that a centralized SD-WAN controller has the intelligence and capability to influence network topology and traffic engineering, a SD-WAN controller, such as the vSmart controller, can provide SD-WAN QoS policy abstraction and construct based on the centralized topology database published via OMP protocol from all SD-WAN domain edge routers across the fabric, and then publish the QoS policy construct for each aggregated hub border router device respectively, for example, a committed information rate (CIR) shape rate together with QoS policy template for specific remote TLOC transport. The CIR shape rate can be based on policy abstraction on the SD-WAN controller, such as a number of hub SD-WAN sessions terminated for a specific branch site.

Particular embodiments may use a default ratio of 1:1 of remote branch bandwidth capability to maximize the usage for initial QoS policy enforcement. Some embodiments may set different ratios based on the number of active hub aggregation border router (BR) based on customer network topology, such as single datacenter with multiple hub border routers or a multiple data-center scenario.

Embodiments of the present disclosure and their advantages are best understood by referring to FIGS. 2 through 7 of the drawings, like numerals being used for corresponding parts of the various drawings. Although certain embodiments may be described in reference to particular illustrated examples, the disclosure herein is not limited to the particular illustrated embodiments and/or configurations and includes any and all variants of the illustrated embodiments and any and all systems, methods, or apparatuses consistent with the teachings of this disclosure, as understood by a person having ordinary skill in the art.

Figure 2:
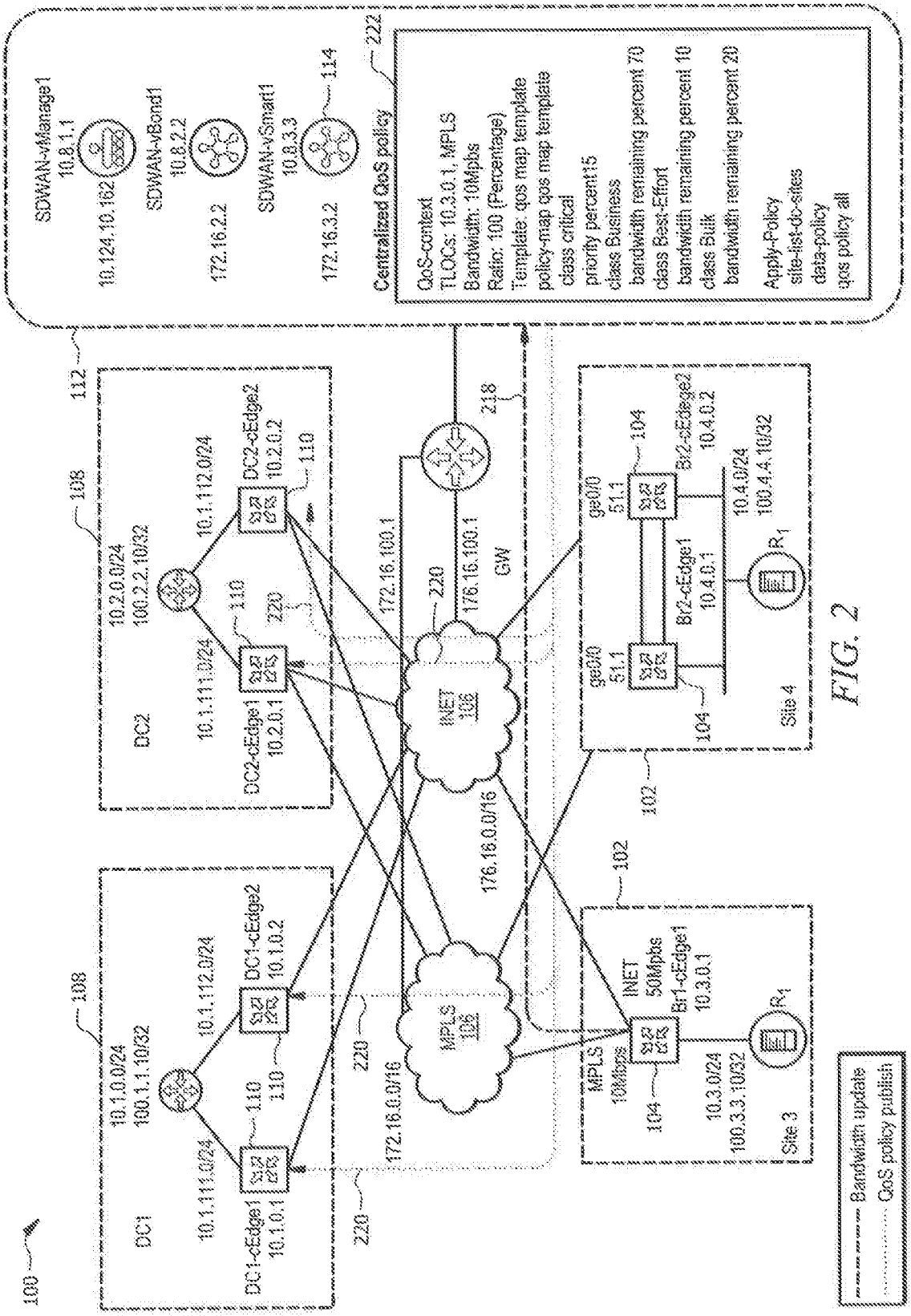
FIG. 2 is a network diagram illustrating an example of centralized QoS policy enforcement, according to some embodiments.

FIG. 2 is a network diagram illustrating an example of centralized QoS policy enforcement, according to some embodiments. The components of SD-WAN 100 illustrated in FIG. 2 are similar to those described above with respect to FIG. 1.

As an example of operation, SD-WAN controller 114 may determine or obtain an initial or default centralized QoS Policy, such as QoS policy 222. In the illustrated example, QoS Policy 222 for a particular TLOC includes a downstream bandwidth of 10 Mbps and a bandwidth shaper ratio of 100 percent. Other QoS policies 222 may include any suitable bandwidth and ratio values.

SD-WAN controller 114 (illustrated as SDWAN-vSmart1) may publish the centralized data policy with QoS policy template to all data center sites after a data center hub router is connected. For example, SD-WAN controller 114 may publish QoS policy 222 to all aggregation edge routers 110 at aggregation sites 108. SD-WAN controller 114 may publish QoS policy 222 by transmitting QoS policy message 220 to aggregation edge routers 110, as illustrated in FIG. 2.

Branch edge router 104 (such as the branch edge router illustrated as Br1-cEdge1) may establish a control connection to SD-WAN controller 114 and publish its own TLOCs with QoS specific attributes like "downstream-bandwidth" and/or "bandwidth shaper ratio" per TLOC basis. Branch edge router 104 may transmit the TLOC publication to SD-WAN controller 114 using bandwidth update message 218, as illustrated in FIG. 2. SD-WAN controller 114 may publish the TLOCs with "downstream-bandwidth" and also "bandwidth shaper ratio" from branch edge router 104 to all of other edge routers within the fabric. For example, SD-WAN controller 114 may transmit the QOS policy to aggregation edger routers 110 using QoS policy message 220, illustrated in FIG. 2.

As a particular example, "bandwidth shaper ratio" may be a default value of 100 with range of 1~100, which means to apply the parent-shaper for per-tunnel QoS policy for the specific TLOC with "downstream-bandwidth"*100/100. In addition, "bandwidth shaper ratio" may be a policy configuration and adjusted on the SD-WAN controller based on number of hub border routers on the data center topologies.

In some embodiments, the branch spoke site actively monitors the WAN usage and collects SDWAN per-TLOC session bandwidth usage locally for bandwidth utilization. Particular embodiments may enforce some policy when the ingress WAN utilization approaches different level of threshold like 85%, 95% of total WAN capability, and the SD-WAN edge router may report and/or publish information such as current ingress WAN bandwidth usage and percent, as well as top X (e.g., top 3) SD-WAN TLOC sessions with bandwidth consumption to the SD-WAN controller periodically when there are congestion alerts.

After the SD-WAN controller receives the real time bandwidth utilization feedback from the edger router, the SD-WAN controller may do additional QoS policy construct and adjust the CIR rate of parent-shape bandwidth for the top X (e.g., 3) SD-WAN sessions and publish the new policy construct like current new CIR rate and group information for TLOCs to those remote hub border routers which hence have the new QoS policy enforcement for congested SDWAN sessions for such remote branch site. An example is illustrated in FIG. 3.

Figure 3:
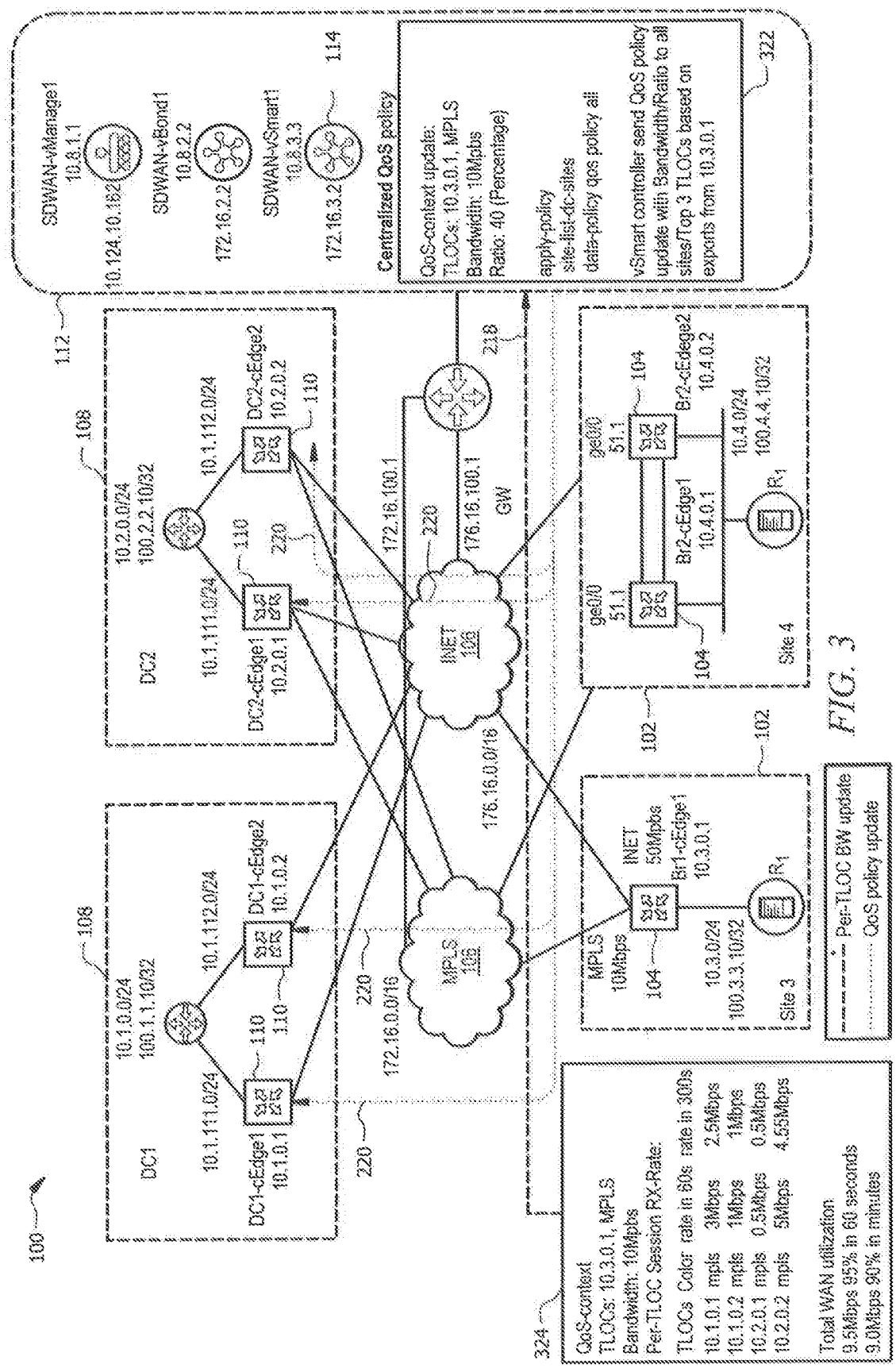
FIG. 3 is a network diagram illustrating per-TLOC session QoS and bandwidth monitoring, according to some embodiments.

FIG. 3 is a network diagram illustrating per-TLOC session QoS and bandwidth monitoring, according to some embodiments. Branch edge router 104 (illustrated as Br1-cEdge1) may monitor bandwidth utilization of its WAN interface with network 106. For example, branch edge router 104 may monitor the WAN usage and collect SD-WAN per-TLOC session bandwidth usage proactively with current and history rate based on different sample intervals like 1 minute and 5 minutes, respectively. The sample intervals may be adjusted and compromised based on the reliability and responsiveness from system robustness and convergence perspective.

Branch edge router 104 may enforce a QoS policy when the ingress WAN utilization approaches different levels of bandwidth utilization threshold (e.g., 85%, 95%, 100% of total WAN capability corresponding to Warning/Critical/Max states). The various thresholds may indicate different level of congestion states.

For example, with above per-TLOC session Rx-rate sample data, when the current sample rate is 95% of bandwidth utilization, and the historical sample rate is 90% of bandwidth utilization, then the current and history usage is in Critical and Warning congestion states, respectively.

As a particular example, branch edge router 104 may send a bandwidth update with per-TLOC information to the SD-WAN controller when it gets into Critical/Warning state with TOP 3 TLOC session bandwidth utilization together with WAN utilization in Mbps and total percent;

In general, upon determining the bandwidth utilization exceeds a threshold, branch edge router 104 may transmit congestion indication 324 to SD-WAN controller 114. In the illustrated example, congestion indication 324 includes current bandwidth utilization (e.g., 95% in 60 seconds) and historical bandwidth utilization (e.g., 90% in 5 minutes). The illustrated example also indicates bandwidth usage per TLOC. In particular embodiments, congestion indication 324 may include any suitable indication of congestion, including some or all of the illustrated indications or any other suitable indications.

Branch edge router 104 may transmit congestion indication 324 to SD-WAN controller 114 using bandwidth update message 218, as illustrated in FIG. 3.

SD-WAN controller 114 may take the action based on the congestion state, and enforce an OMP TLOC update with "bandwidth shaper ratio" 40, for example, to components of the SD-WAN fabric. The TLOC update is to facilitate dynamic shaping of the top TLOC session bandwidth consumption to bring the total ingress bandwidth usage under Critical congestion state for border edge router 104, such as the illustrated Br1-cEdge1.

In general, SD-WAN controller 114 may determine updated QoS policy 322 based on the previously received TLOC publications and the received congestion indication. Updated QoS policy 322 is updated to reduce congestion at branch edge routers 104. In the illustrated example, updated QoS policy 322 includes a bandwidth shaper ratio of 40 percent. In particular embodiments, updated QoS policy 322 may include any suitable QoS attributes to reduce congestion.

SD-WAN controller 114 may transmit updated QOS policy 322 to aggregation edger routers 110 using QoS policy message 220, illustrated in FIG. 3.

The plurality of aggregation edge routers 110 receive the TLOC update with "bandwidth shaper ratio 40" which results in a parent-shaper update for per-tunnel QoS policy for the specific TLOC at "10 Mps*40/100", which is 4 Mbps. Aggregation edge routers 110 communicate with branch edge routers 104 according to the updated QoS policy and determined parent shape rate.

Branch edge routers 104 may continuously monitor their bandwidth usage for their local TLOC WAN interfaces. When a WAN utilization Warning state, for example, is cleared, branch edge router 104 sends a bandwidth update with per-TLOC info and WAN utilization to SD-WAN controller 114.

SD-Wan controller 114 may reset the "bandwidth shaper ratio" and send the TLOC update again once the congestion Critical state is cleared for a history sample interval. The plurality of aggregation edge routers 110 receive the TLOC update with default "bandwidth shaper ratio", which results in default parent-shaper rate.

Given that only the SD-WAN controller, such as a vSmart controller, receives the bandwidth update for an edge router when ingress WAN congestion and/or excess bandwidth usage occurs, the information is agnostic for a hub aggregate border router because they will only receive QOS policy construct update like CIR bandwidth and shaper ratio with respective TLOC information, and then instantiate QoS policy with respective SD-WAN sessions. An advantage is that particular embodiments are scalable and effective and only the centralized Sd-WAN controller has the visibility and congestion state from edge devices and hub border routers simply accept and enforce the QoS policy construct with new parent shaper-rate update from the centralized SD-WAN controller.

In particular embodiments, fairness for per-TLOC session shaper is enforced based on the TLOC update from the SD-WAN controller which is sent to all edge router in the fabric.

Additionally, the SD-WAN controller (or other component of SD-WAN management network 112) may adjust the TLOC weight value based on the remote WAN bandwidth usage as well to influence ingress non-ECMP load-balance for the specific branch site.

In general, particular embodiments include a mechanism for centralized QoS policy enforcement with QoS and bandwidth monitoring without incurring in-band control-plane communication overhead and ensuring reliability for measuring and reporting the throughput and loss between sender and receiver.

Figure 4:
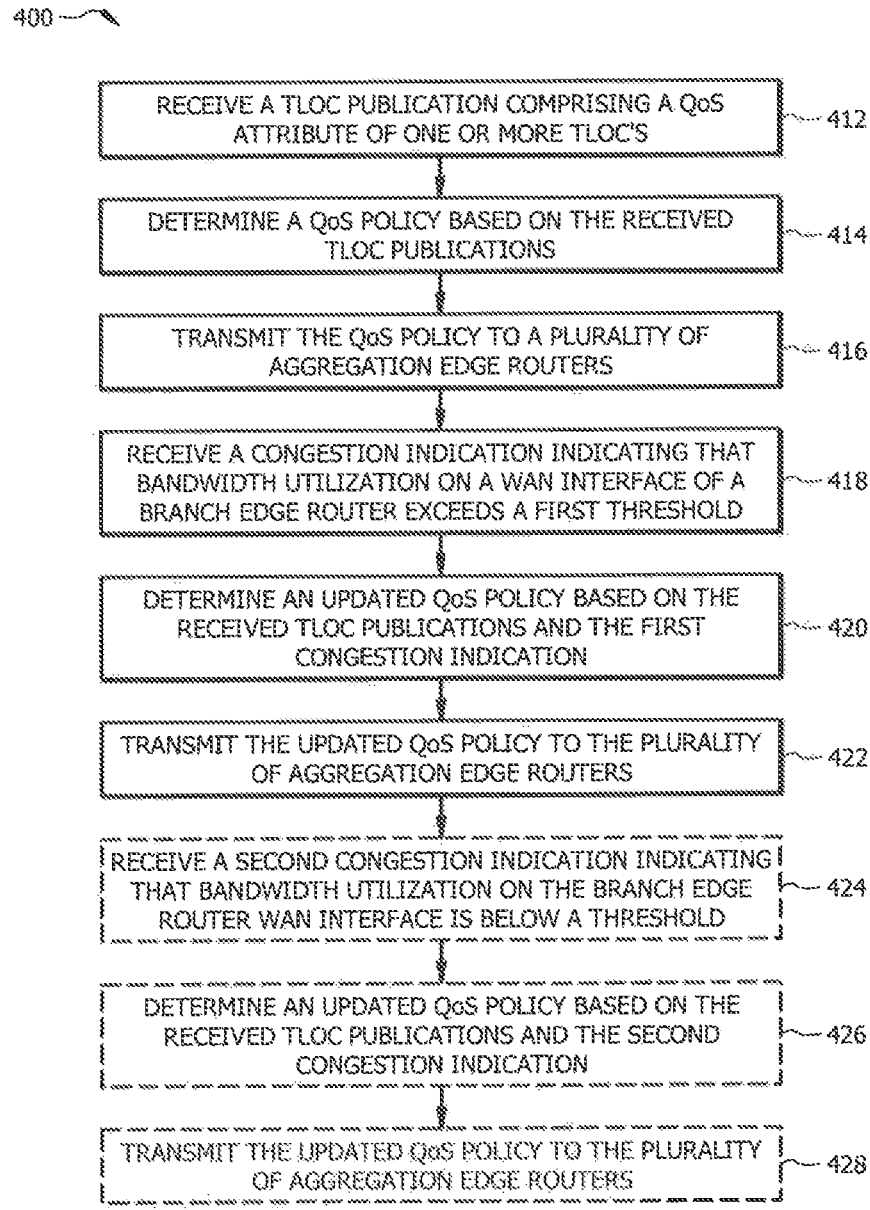
FIG. 4 is a flow diagram illustrating an example method in a SD-WAN controller.

FIG. 4 is a flow diagram illustrating an example method in a SD-WAN controller. The SD-WAN controller is part of a SD-WAN network comprising a plurality of aggregation edge routers and a plurality of branch edge routers. The steps of method 400 in FIG. 4 may be performed by SD-WAN controller 114 of SD-WAN network 100 illustrated in FIGS. 2 and 3.

The method begins at step 412, where an SD-WAN controller receives, from each of the plurality of branch edge routers, a TLOC publication comprising a QoS attribute of one or more TLOCs configured on the branch edge router. For example, SD-WAN controller 114 may receive TLOC publications via bandwidth update message 218 from branch edge routers 104. In particular embodiments, the TLOC publication may include a downstream bandwidth, a bandwidth shaper ratio, and/or any other suitable QoS attribute.

At step 414, the SD-WAN controller determines a QoS policy based on the received TLOC publications. For example, SD-WAN controller 114 may, based on received bandwidth update messages 218 from each of the border edge routers 104, determine a QoS policy for the SD-WAN network.

At step 416, the SD-WAN controller transmits the QoS policy to the plurality of aggregation edge routers. For example, SD-WAN controller 114 may transmit the determined QoS policy to aggregation edge routers 110 using QoS policy message 220, as illustrated in FIG. 2.

At step 418, the SD-WAN controller receives, from a branch edge router of the plurality of branch edge routers, a congestion indication indicating that bandwidth utilization on a WAN interface of the branch edge router exceeds a first threshold. For example, branch edge router 104 may enforce a QoS policy when the ingress WAN utilization approaches different levels of bandwidth utilization threshold (e.g., 85%, 95%, 100% of total WAN capability corresponding to Warning/Critical/Max states). The various thresholds may indicate different level of congestion states. In general, upon determining the bandwidth utilization exceeds a threshold, branch edge router 104 may transmit a congestion indication, such as congestion indication 324, to SD-WAN controller 114.

At step 420, the SD-WAN controller determines an updated QoS policy based on the received TLOC publications and the first congestion indication to reduce congestion at the branch edge router. For example, SD-WAN controller 114 may update the QoS policy determined at step 414 with the received congestion indication. To reduce congestion at the branch edge router sending the congestion indication, SD-WAN controller 114 may modify a TLOC bandwidth shaper ratio from 100 percent to 40 percent, for example.

At step 422, the SD-WAN controller transmits the updated QoS policy to the plurality of aggregation edge routers. For example, SD-WAN controller 114 may transmit the updated QoS policy to aggregation edge routers 110 using QoS policy message 220, as illustrated in FIG. 3.

At step 424, the SD-WAN controller may receive, from the branch edge router of the plurality of branch edge routers, a second congestion indication indicating that bandwidth utilization on the branch edge router WAN interface is below a threshold. For example, branch edge router 104 may determine that the congestion has cleared based on bandwidth utilization of its WAN interface dropping below a threshold.

In some embodiments, the threshold may the same as the first threshold used to determine congestion occurred. In some embodiments, the first and second threshold may be different. For example, the second threshold (e.g., 85% utilization) may be lower than the first threshold (e.g., 95% utilization) so that the branch edge router is more confidant that congestion has cleared. The second threshold may include current and historical thresholds. For example, the threshold may require the bandwidth utilization to be below a particular rate for a particular length of time. In general, SD-WAN controller 114 may receive a congestion indication, such as congestion indication 324, from branch edge router 104.

At step 426, the SD-WAN controller determines an updated QoS policy based on the received TLOC publications and the second congestion indication. For example, SD-WAN controller 114 may update the QoS policy determined at step 414 with the received congestion indication indicating that congestion has cleared at branch edge router 104. SD-WAN controller 114 may modify a TLOC bandwidth shaper ratio from 40 percent to 100 percent, for example.

At step 428, the SD-WAN controller transmits the updated QoS policy to the plurality of aggregation edge routers. For example, SD-WAN controller 114 may transmit the updated QoS policy to aggregation edge routers 110 using QoS policy message 220.

In some embodiments, OMP may be used to receive and/or transmit QoS information between branch edge routers, an SDN controller, and aggregation edge routers.

Modifications, additions, or omissions may be made to method 400 depicted in FIG. 4. Method 400 may include more, fewer, or other steps. Additionally, steps may be performed in parallel or in any suitable order.

Figure 5:
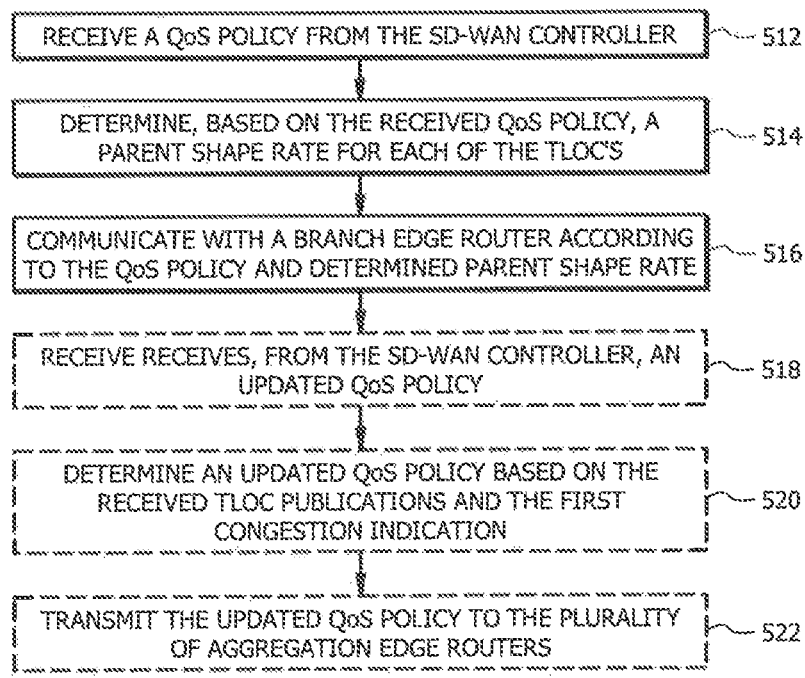
FIG. 5 is a flow diagram illustrating an example method in an aggregate edge router.

FIG. 5 is a flow diagram illustrating an example method in an aggregate edge router. The aggregate edge router is part of a SD-WAN network comprising a SD-WAN controller and a plurality of branch edge routers. The steps of method 500 in FIG. 5 may be performed by aggregation edge router 110 of SD-WAN network 100 illustrated in FIGS. 2 and 3.

At step 512, the aggregation edge router receives a QoS policy from the SD-WAN controller. The QoS policy is based on TLOC publications from the plurality of branch edge routers, and the QoS policy comprises a QoS attribute for each TLOC published by the plurality of branch edge routers. For example, branch edge routers 104 may transmit TLOC publications to SD-WAN controller 114. Based on the TLOC publications, SD-WAN controller 114 determines a QoS policy and transmits the QoS Policy to aggregation edge routers 110.

At step 514, the aggregation edge router determines, based on the received QoS policy, a parent shape rate for each of the TLOCs. For example, aggregation edge router 110 may determine a parent shape rate based on remote WAN bandwidth at the branch edge routers. The remote WAN bandwidth at the branch edge routers may be included in the received QoS policy.

At step 516, the aggregation edge router communicates with a branch edge router according to the QoS policy and determined parent shape rate. For example, aggregation edge router 110 may limit an amount communicated to branch edge router 104 according to the QoS policy and determined parent shape rate.

At step 518, the aggregation edge router may receive, from the SD-WAN controller, an updated QoS policy. The updated QoS policy is based on the TLOC publications from the plurality of branch edge routers and a congestion indication from a branch edge router of the plurality of branch edge routers. For example, branch edge router 104 may detect congestion on its WAN interface and send a congestion indication to SD-WAN controller 114. Based on the congestion indication, SD-WAN controller 114 determines an updated QoS policy and transmits the updated QoS Policy to aggregation edge routers 110.

At step 520, the aggregation edge router may determine, based on the updated QoS policy, an updated parent shape rate for each of the TLOCs, and communicate with a branch edge router according to the updated QoS policy and updated parent shape rate at step 522.

Modifications, additions, or omissions may be made to method 500 depicted in FIG. 5. Method 500 may include more, fewer, or other steps. Additionally, steps may be performed in parallel or in any suitable order.

Figure 6:
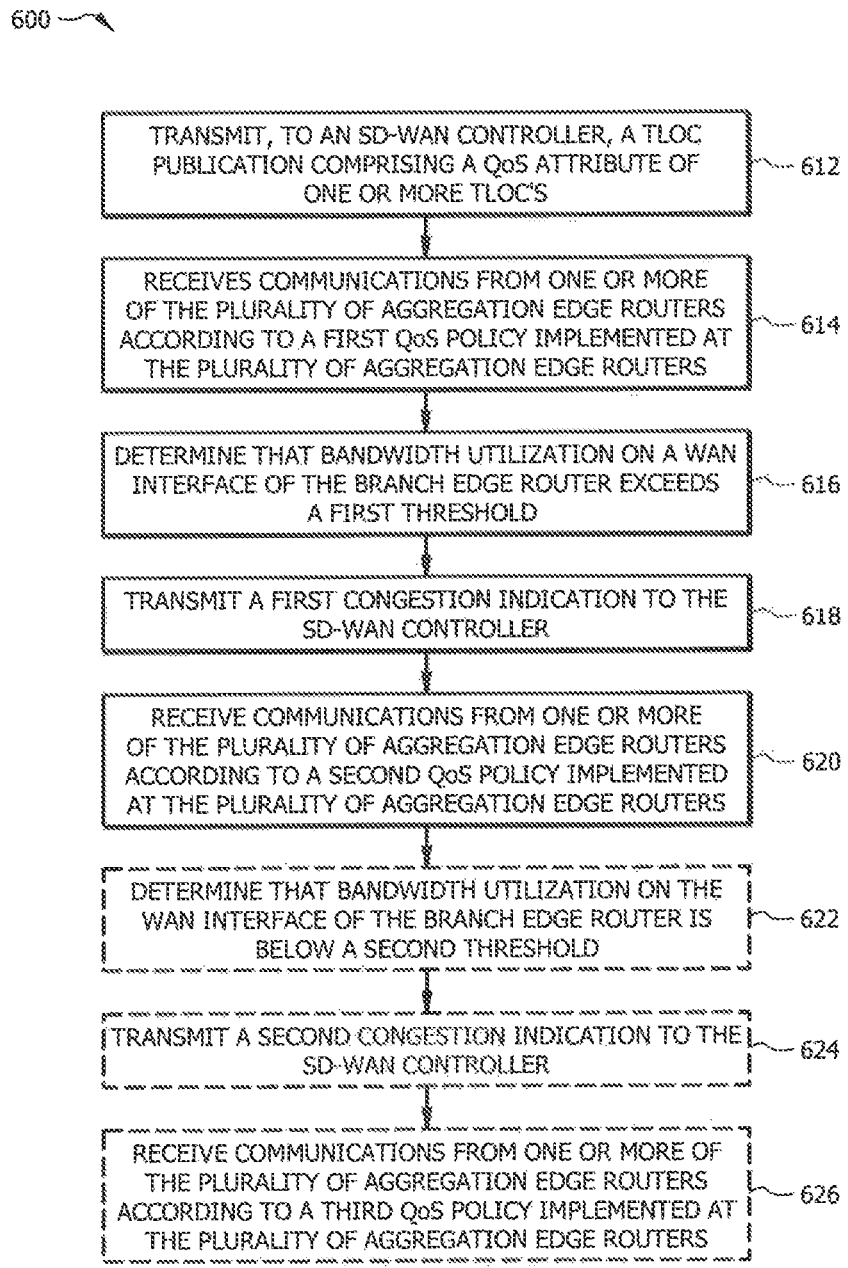
FIG. 6 is a flow diagram illustrating an example method in a branch edge router.

FIG. 6 is a flow diagram illustrating an example method in a branch edge router. The branch edge router is part of a SD-WAN network comprising a SD-WAN controller and a plurality of aggregation edge routers. The steps of method 600 in FIG. 6 may be performed by branch edge router 104 of SD-WAN network 100 illustrated in FIGS. 2 and 3.

The method begins at step 612, where a branch edge router transmits, to an SD-WAN controller, a TLOC publication comprising a QoS attribute of one or more TLOCs configured on the branch edge router. For example, branch edge router 104 may be configured with 3 TLOCs. Branch edge router 104 may transmit TLOC publications for the 3 TLOCs to SD-WAN controller 114. In some embodiments, branch edge router 104 may transmit the TLOC publications using OMP.

The TLOC publications include a QoS attribute. In particular embodiments, the QoS attribute may include a downstream bandwidth, a bandwidth shaper ratio, and/or any other suitable QoS attribute.

At step 614, the branch edge router receives communications from one or more of the plurality of aggregation edge routers according to a first QoS policy implemented at the plurality of aggregation edge routers. For example, SD-WAN controller 114 may, based on the TLOC publications from branch edge routers 104, determine a QoS policy and transmit the QoS policy to aggregation edge routers 110. Aggregation edge routers 110 use the QoS policy to communicate with branch edge routers 104.

At step 616, the branch edge router determines that bandwidth utilization on a WAN interface of the branch edge router exceeds a first threshold. For example, branch edge router 104 may determine congestion based on any of the examples described above with respect to FIGS. 2 and 3.

At step 618, the branch edge router transmits a first congestion indication to the SD-WAN controller. For example, branch edge router 104 may transmit a congestion indication, such as congestion indication 324, to SD-WAN controller 114.

At step 620, the branch edge router receives communications from one or more of the plurality of aggregation edge routers according to a second QoS policy implemented at the plurality of aggregation edge routers. The second QoS policy is based at least in part on the first congestion indication. For example, SD-WAN controller 114 may, based on the congestion indication, determine an updated QoS policy to reduce congestion and transmit the QoS policy to aggregation edge routers 110. Aggregation edge routers 110 use the updated QoS policy to communicate with branch edge routers 104.

At step 622, the branch edge router may determine that bandwidth utilization on the WAN interface of the branch edge router is below a second threshold. For example, branch edge router 104 may determine that congestion has cleared or reduced based on any of the examples described above with respect to FIGS. 2 and 3.

At step 624, the branch edge router may transmit a second congestion indication to the SD-WAN controller. For example, branch edge router 104 may transmit a congestion indication, such as congestion indication 324, to SD-WAN controller 114.

At step 626, the branch edge router receives communications from one or more of the plurality of aggregation edge routers according to a third QoS policy implemented at the plurality of aggregation edge routers, the third QoS policy based at least in part on the second congestion indication. For example, SD-WAN controller 114 may update its QoS policy based on the second congestion indication and transmit the updated QoS policy to aggregation edge routers 110. Aggregation edge routers 110 may communicate with branch edge router 104 according to the updated QoS policy.

Modifications, additions, or omissions may be made to method 600 depicted in FIG. 6. Method 600 may include more, fewer, or other steps. Additionally, steps may be performed in parallel or in any suitable order.

Figure 7:
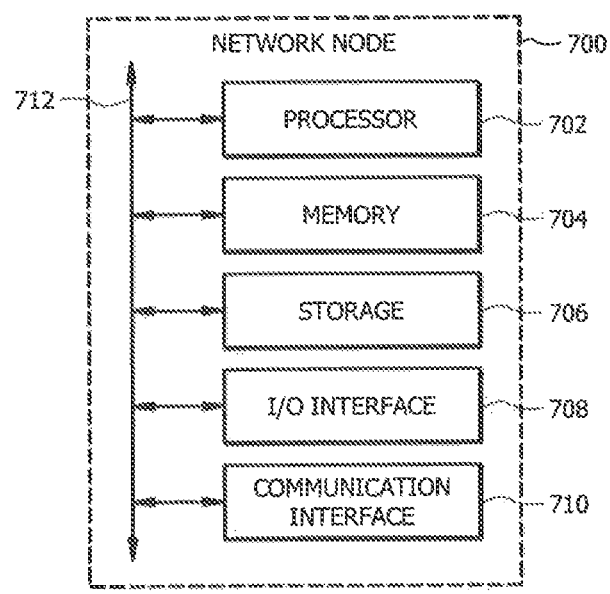
FIG. 7 is a block diagram illustrating an example network node, according to particular embodiments.

FIG. 7 is a block diagram illustrating an example network node, according to particular embodiments. A network node may comprise a SD-WAN controller, an aggregation edge router, and/or a branch edge router (such as SD-WAN controller 114, aggregation edge routers 110, and/or branch edge routers 104 described with respect to FIGS. 2-3).

In particular embodiments, one or more network nodes 700 perform one or more steps of one or more methods described or illustrated herein, such as the methods described with respect to FIGS. 4-6. In particular embodiments, one or more network nodes 700 provide functionality described or illustrated herein, such as the functionality described with respect to FIGS. 2-3. In particular embodiments, software running on one or more network nodes 700 performs one or more steps of one or more methods described or illustrated herein or provides functionality described or illustrated herein. Particular embodiments include one or more portions of one or more network nodes 700. Herein, reference to a network node may encompass a computing device, and vice versa, where appropriate. Moreover, reference to a network node may encompass one or more network nodes, where appropriate.

Particular embodiments may include any suitable number of network nodes 700. Network node 700 may take any suitable physical form. As example and not by way of limitation, network node 700 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, network node 700 may include one or more network nodes 700; be unitary or distributed; span multiple locations; span multiple machines; span multiple data centers; or reside in a cloud, which may include one or more cloud components in one or more networks.

Where appropriate, one or more network nodes 700 may perform without substantial spatial or temporal limitation one or more steps of one or more methods described or illustrated herein. As an example and not by way of limitation, one or more network nodes 700 may perform in real time or in batch mode one or more steps of one or more methods described or illustrated herein. One or more network nodes 700 may perform at different times or at different locations one or more steps of one or more methods described or illustrated herein, where appropriate.

In particular embodiments, network node 700 includes a processor 702, memory 704, storage 706, an input/output (I/O) interface 708, a communication interface 710, and a bus 712. Although this disclosure describes and illustrates a particular network node having a particular number of particular components in a particular arrangement, particular embodiments may include any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. Processor 702 may include any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702.

In particular embodiments, processor 702 may include one or more internal registers for data, instructions, or addresses. Processor 702 may include any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, particular embodiments may include any suitable processor.

In particular embodiments, memory 704 includes main memory for storing instructions for processor 702 to execute or data for processor 702 to operate on. As an example and not by way of limitation, network node 700 may load instructions from storage 706 or another source (such as, for example, another computer system 700) to memory 704. Processor 702 may then load the instructions from memory 704 to an internal register or internal cache.

To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere).

One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. Particular embodiments may include any suitable RAM. Memory 704 may include one or more memories 704, where appropriate. Although this disclosure describes and illustrates particular memory, particular embodiments may include any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to network node 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 706 may take any suitable physical form.

Storage 706 may include one or more storage control units facilitating communication between processor 702 and storage 706, where appropriate. Where appropriate, storage 706 may include one or more storages 706. Although this disclosure describes and illustrates particular storage, particular embodiments may include any suitable storage.

In particular embodiments, I/O interface 708 includes hardware, software, or both, providing one or more interfaces for communication between network node 700 and one or more I/O devices. Network node 700 may include one or more of these I/O devices, where appropriate. One or more of these I/O devices may enable communication between a person and network node 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Particular embodiments may include any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, particular embodiments may include any suitable I/O interface. In particular embodiments, I/O interface 708 may include an interface to a remote network management system.

In particular embodiments, communication interface 710 includes hardware, software, or both providing one or more interfaces for communication (such as, for example, packet-based communication) between network node 700 and one or more other network nodes 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network.

Particular embodiments may include any suitable network and any suitable communication interface 710 for it. As an example and not by way of limitation, network node 700 may communicate with an ad hoc network, a personal area network (PAN), a LAN, WAN, MAN, or one or more portions of the Internet or a combination of two or more of these. One or more portions of one or more of these networks may be wired or wireless. As an example, network node 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Network node 700 may include any suitable communication interface 710 for any of these networks, where appropriate. Communication interface 710 may include one or more communication interfaces 710, where appropriate. Although this disclosure describes and illustrates a particular communication interface, particular embodiments may include any suitable communication interface.

In particular embodiments, bus 712 includes hardware, software, or both coupling components of network node 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, particular embodiments may include any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

What is claimed is:

1. A method performed by a software defined wide area network (SD-WAN) controller in a SD-WAN network comprising a plurality of aggregation edge routers and a plurality of branch edge routers, the method comprising:
    receiving, from each of the plurality of branch edge routers, a transmit location (TLOC) publication comprising a quality of service (QoS) attribute of one or more TLOCs configured on the branch edge router;
    determining a QoS policy based on the received TLOC publications;
    transmitting the QoS policy to the plurality of aggregation edge routers;
    receiving, from a branch edge router of the plurality of branch edge routers, a first congestion indication indicating that bandwidth utilization on a wide area network (WAN) interface of the branch edge router exceeds a first threshold;
    determining an updated QoS policy based on the received TLOC publications and the first congestion indication to reduce congestion at the branch edge router; and
    transmitting the updated QoS policy to the plurality of aggregation edge routers.

2. The method of claim 1, further comprising:
    receiving, from the branch edge router of the plurality of branch edge routers, a second congestion indication indicating that bandwidth utilization on the branch edge router WAN interface is below a second threshold;
    determining an updated QoS policy based on the received TLOC publications and the second congestion indication; and
    transmitting the updated QoS policy to the plurality of aggregation edge routers.

3. The method of claim 1, wherein the QoS attribute comprises a downstream bandwidth.

4. The method of claim 1, wherein the QoS attribute comprises a bandwidth shaper ratio.

5. The method of claim 4, wherein the bandwidth shaper ratio is based on a number of aggregation edge routers in communication with the branch edge router.

6. The method of claim 1, wherein the TLOC publications are published using overlay management protocol (OMP).

7. The method of claim 1, wherein bandwidth utilization includes current and historical bandwidth utilization.

8. A method performed by an aggregation edge router in a software defined wide area network (SD-WAN) comprising a SD-WAN controller and a plurality of branch edge routers, the method comprising:
receiving a quality of service (QoS) policy from the SD-WAN controller, wherein the QoS policy is based on transmit location (TLOC) publications from the plurality of branch edge routers, and wherein the QoS policy comprises a QoS attribute for each TLOC published by the plurality of branch edge routers;
determining, based on the received QoS policy, a parent shape rate for each of the TLOCs; and
communicating with a branch edge router according to the QoS policy and determined parent shape rate.

9. The method of claim 8, further comprising:
receiving, from the SD-WAN controller, an updated QoS policy, wherein the updated QoS policy is based on the TLOC publications from the plurality of branch edge routers and a congestion indication from a branch edge router of the plurality of branch edge routers;
determining, based on the updated QoS policy, an updated parent shape rate for each of the TLOCs; and
communicating with a branch edge router according to the updated QoS policy and updated parent shape rate.

10. The method of claim 8, wherein the QoS attribute comprises a downstream bandwidth.

11. The method of claim 8, wherein the QoS attribute comprises a bandwidth shaper ratio.

12. The method of claim 11, wherein the bandwidth shaper ratio is based on a number of aggregation edge routers in communication with the branch edge router.

13. The method of claim 8, wherein the QoS policy is received using overlay management protocol (OMP).

14. A method performed by a branch edge router in a software defined wide area network (SD-WAN) comprising a SD-WAN controller and a plurality of aggregation edge routers, the method comprising:
transmitting, to the SD-WAN controller, a transmit location (TLOC) publication comprising a quality of service (QoS) attribute of one or more TLOCs configured on the branch edge router;
receiving communications from one or more of the plurality of aggregation edge routers according to a first QoS policy implemented at the plurality of aggregation edge routers;
determining that bandwidth utilization on a wide area network (WAN) interface of the branch edge router exceeds a first threshold;
transmitting a first congestion indication to the SD-WAN controller; and
receiving communications from one or more of the plurality of aggregation edge routers according to a second QoS policy implemented at the plurality of aggregation edge routers, the second QoS policy based at least in part on the first congestion indication.

15. The method of claim 14, further comprising:
determining that bandwidth utilization on the WAN interface of the branch edge router is below a second threshold;
transmitting a second congestion indication to the SD-WAN controller; and
receiving communications from one or more of the plurality of aggregation edge routers according to a third QoS policy implemented at the plurality of aggregation edge routers, the third QoS policy based at least in part on the second congestion indication.

16. The method of claim 14, wherein the QoS attribute comprises a downstream bandwidth.

17. The method of claim 14, wherein the QoS attribute comprises a bandwidth shaper ratio.

18. The method of claim 17, wherein the bandwidth shaper ratio is based on a number of aggregation edge routers in communication with the branch edge router.

19. The method of claim 14, wherein the TLOC publications are transmitted to the SD-WAN controller using overlay management protocol (OMP).

20. The method of claim 14, wherein bandwidth utilization includes current and historical bandwidth utilization.

* * * * *